United States Patent [19]

Tanikawa et al.

[11] Patent Number: 5,625,275
[45] Date of Patent: Apr. 29, 1997

[54] POWER SUPPLY WHICH PROVIDES A VARIABLE CHARGING CURRENT TO A BATTERY IN A PORTABLE COMPUTER SYSTEM

[75] Inventors: Roy Tanikawa, Irvine; Hien Le, Garden Grove, both of Calif.

[73] Assignee: AST Research, Inc., Irvine, Calif.

[21] Appl. No.: 449,534

[22] Filed: May 24, 1995

[51] Int. Cl.$^6$ .................................................. H02J 7/00
[52] U.S. Cl. .................................... 320/32; 320/22
[58] Field of Search .............................. 320/30, 31, 32, 320/33, 21, 22, 23

[56] References Cited

U.S. PATENT DOCUMENTS

| 5,239,495 | 8/1993 | Nanno et al. | 364/707 |
| 5,349,282 | 9/1994 | McClure | 320/32 |
| 5,465,039 | 11/1995 | Narita et al. | 320/32 |

*Primary Examiner*—Peter S. Wong
*Assistant Examiner*—Patrick B. Law

*Attorney, Agent, or Firm*—Knobbe, Martens, Olson & Bear, LLP

[57] ABSTRACT

A power supply for a rechargeable battery in a portable computer system is disclosed which adjusts the level of charging current depending upon the current drawn by the portable computer system. The power supply includes an AC adapter which supplies input current for operating the computer system and for charging the battery. Sensors are connected to the AC adapter, the battery, and an output of the power supply to detect the level of input current from the AC adapter, the level of charging current supplied to the battery, and the output voltage level of the power supply. A controller is connected to each of the sensors and monitors the input current level, the charging current level, and the output voltage level. The controller generates a control signal which indicates whether any one of the levels has exceeded a respective predetermined maximum value. A charging current control circuit is connected to the controller and to the battery and controls current flow between the AC adapter and the battery based upon the control signal generated by the controller. When the computer draws less current, the battery charging current is increased accordingly, thus using all of the power output from the AC adapter.

16 Claims, 2 Drawing Sheets

POWER SUPPLY WHICH PROVIDES A VARIABLE CHARGING CURRENT TO A BATTERY IN A PORTABLE COMPUTER SYSTEM

FIELD OF THE INVENTION

The invention relates to battery chargers and, in particular, to a system for charging a rechargeable battery in a portable computer.

BACKGROUND OF THE INVENTION

Portable or laptop computers are commonly provided with rechargeable batteries which power the computer when conventional power outlets are not available. An AC adapter is also typically provided to power the computer when the user does have access to an outlet. The AC adapter further provides power to a battery charging power supply which recharges the batteries.

In most portable computer systems, the power supply supplies two levels of battery charging current: one level when the computer system is off and a second when the computer system is on. To ensure that there is always sufficient current available for charging the battery when the computer system is also drawing current, the level of charging current output by the battery charger must be selected in accordance with the maximum current which could be drawn by the system. Thus, the AC adapter must be designed for the situation in which the computer is using maximum power and the battery requires charging. Because the adapter is designed for this "worst case" situation, the size of the AC adapter is often larger than necessary for typical operation where the computer is not drawing the maximum current and the balance of power available from the AC adapter is wasted.

Alternatively, some systems utilize a constant current AC adapter to charge the battery and power the computer. The output of the AC adapter is directly connected to the battery and to the DC/DC power supply which powers the computer system. In this manner, the battery charging power supply is eliminated and all of the current from the adapter that is not used by the computer system is available to charge the battery. However, in this configuration, the output voltage of the adapter is clamped to the battery voltage and the output capabilities of the adapter are significantly reduced. For example, if the AC adapter was rated at 20 Volts with a constant current of 1 amp, the output power of the adapter would be 20 Watts. If a 10 Volt battery was connected to the output of the adapter, the output capacity of the adapter would be reduced by half to 10 Watts.

SUMMARY OF THE INVENTION

The present invention provides a power supply for a rechargeable battery that adjusts the battery charging current depending upon the current drawn by the portable computer system at any given time. The power supply includes a regulator controller which monitors the output current and output voltage of the battery to provide over voltage and short circuit protection. The controller further monitors the level of input current being drawn by the computer system. When the computer draws less current, the battery charging current is increased accordingly, thus efficiently using all of the available power output from the AC adapter. Conversely, when the current drawn by the computer system is above a threshold value at which battery charging is not feasible, the regulator does not direct any charging current to the battery.

The invention provides a power supply for recharging a battery in a portable computer system. The power supply comprises an AC adapter which supplies input current for operating the computer system and for charging the battery. A first sensor is connected to the AC adapter which detects the level of input current from the AC adapter being drawn by the computer system. A second sensor is connected to the battery which detects the level of charging current supplied to the battery. A third sensor is connected to an output of the power supply which detects the output voltage level of the power supply. A controller is connected to each of the sensors and monitors the input current level, the charging current level, and the output voltage level. The controller generates a control signal which indicates whether any one of the levels has exceeded a respective predetermined maximum value. A charging current control circuit is connected to the controller and to the battery and controls current flow between the AC adapter and the battery based upon the control signal generated by the controller. The first sensor may comprise a resistor connected between the AC adapter and a DC/DC converter which supplies operating power for the computer system. The second sensor may comprise a resistor connected between the battery and a ground reference. The third sensor may comprise a resistor connected to the output of the power supply. The charging current control circuit may include a transistor connected to the AC adapter and to the battery, wherein the transistor is biased on and off in accordance with the control signal generated by the controller to control current flow between the AC adapter and the battery. The power supply may further comprise a filter connected between the charging current control circuit and the battery which filters the charging current supplied to the battery.

Another aspect of the invention is a regulator for controlling current flow between an AC adapter and a battery in a portable computer system. The regulator comprises a controller connected to the AC adapter, the battery, and an output of the regulator to monitor a first input signal indicative of an input current level supplied by the AC adapter, a second input signal indicative of a charging current level supplied to the battery, and a third input signal indicative of an output voltage of the regulator. The controller generates an output signal which indicates whether any of the input signals has exceeded a respective predetermined maximum value. A charging current control circuit is connected to the controller and to the battery and supplies current from the AC adapter to charge the battery when the output signal from the controller indicates that none of the input signals are above the respective predetermined maximum values. The charging current control circuit may include a transistor connected between the AC adapter and the battery, wherein the transistor is biased on and off in accordance with the output signal generated by the controller to control current flow between the AC adapter and the battery. The regulator may further comprise a driving circuit connected between the controller and the charging current control circuit for driving the transistor. The regulator may also comprise a filter connected between the charging current control circuit and the battery which filters the charging current supplied to the battery.

Another aspect of the invention is a power supply for recharging a battery in a portable computer system. The power supply comprises an AC adapter which supplies input current for operating the computer system and for charging the battery. An input current sensing circuit is connected to the AC adapter which detects the level of input current from the AC adapter and generates a voltage indicative of the input current level. A charging current sensing circuit is connected to the battery which detects the level of charging current supplied to the battery and generates a voltage indicative of the charging current level. An output voltage sensing circuit is connected to an output of the power supply which detects a voltage indicative of an output voltage level of the power supply. A controller is connected to each of the sensing circuits and compares the input current level, the charging current level, and the output voltage level with a respective predetermined maximum value. The controller generates a control signal which indicates whether any one of the levels has exceeded the respective predetermined maximum value. A charging current control circuit is connected to the controller and to the battery and controls current flow between the AC adapter and the battery based upon the control signal generated by the controller. The input current sensing circuit may include a resistor connected between the AC adapter and a DC/DC converter which supplies operating power for the computer system. The charging current sensing circuit may include a resistor connected between the battery and a ground reference which senses a voltage proportional to the charging current. The output voltage sensing circuit may include a resistor connected to the output of the power supply.

Yet another aspect of the invention is a method of regulating the amount of charging current supplied to a rechargeable battery by a regulator in a portable computer system including an AC adapter which supplies input current for operating the computer system and for charging the battery. The method comprises the steps of sensing the level of input current supplied by the AC adapter; sensing the level of charging current supplied to the battery; sensing the level of an output voltage of the regulator; monitoring the input current level, the charging current level, and the output voltage level; generating a control signal which indicates whether any one of the levels has exceeded a predetermined maximum value; and controlling current flow between the AC adapter and the battery based upon the control signal.

DETAILED DESCRIPTION OF THE INVENTION

Figure 1:
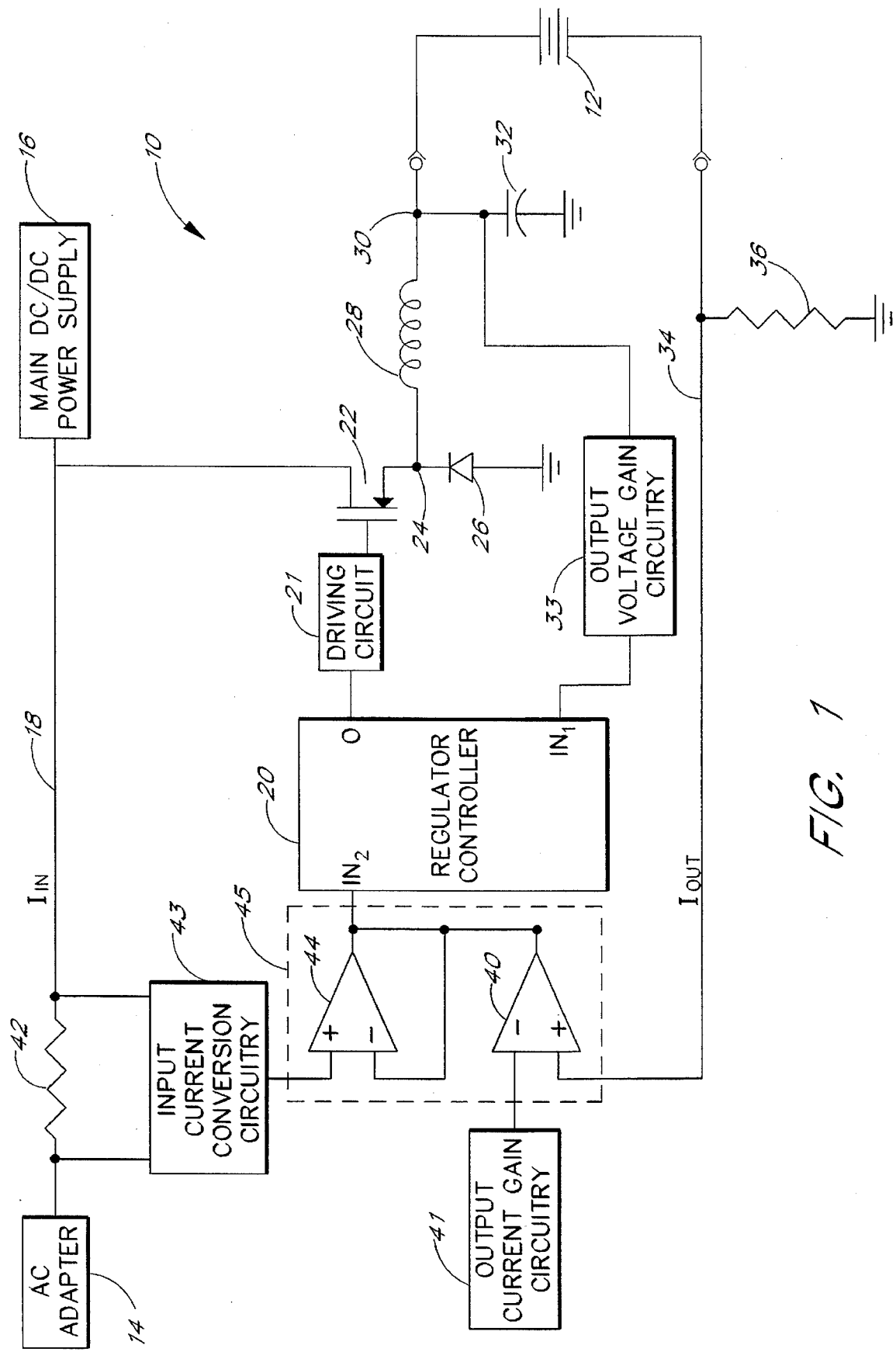
FIG. 1 is a block diagram of a battery charging system in accordance with the present invention.

FIG. 1 illustrates a block diagram of a power supply 10 constructed in accordance with the present invention. The power supply 10 supplies charging current to a rechargeable battery 12 which may be used, for example, in a portable or laptop computer system. The computer system includes a constant voltage AC adapter 14 which may comprise a AC/DC adapter connectable to a standard wall socket or a car adapter connectable to a power source, such as a cigarette lighter, in an automobile. The AC adapter 14 is connected to a main DC/DC power supply 16 along line 18. The DC/DC power supply 16 operates in a conventional manner to provide power for operating various components in the portable computer system.

The power supply 10 includes a pulse-width modulated (PWM) switching regulator 20 which operates conventionally to adjust the pulse width output therefrom in accordance with the level of the input control signals $I_{OUT}$, $V_{OUT}$, and $I_{IN}$. In particular, the regulator 20 monitors the battery charging current ($I_{OUT}$) and the output voltage ($V_{OUT}$) to provide over voltage and short circuit protection. As the level of the signals $I_{OUT}$ and $V_{OUT}$ increases, the pulse width output by the regulator 20 at O is narrowed and less charging current per cycle is supplied to the battery 12. When either of these control signals is above a predetermined threshold value, the regulator output is disabled so that no charging current is supplied to the battery 12.

In accordance with the present invention, the regulator further monitors the system input current ($I_{IN}$) supplied by the AC adapter 14 and controls the charging current supplied to the battery 12 accordingly. If the current drawn by the computer system is below a predetermined threshold value above which battery charging is not feasible, the battery charging current is increased accordingly so as to efficiently use all of the available power output from the AC adapter 14. However, if the current drawn by the computer system is above the threshold value, the regulator output is disabled and no charging current is directed to the battery 12.

The PWM regulator comprises a controller 20 and a charging current control circuit which includes a driving circuit 21, a MOSFET 22, a diode 26, an inductor 28, and a capacitor 32, and output voltage gain circuitry 33. The output O of the regulator controller 20 is connected to the gate of the MOSFET 22 by way of the driving circuit 21. The drain of the MOSFET 22 is connected to the AC adapter output line 18 and the source of the MOSFET 22 is connected to a common node 24. The diode 26 is connected between the common node 24 and a ground reference. The inductor 28 is connected between the common node 24 and a common node 30 and the capacitor 32 is connected between the common node 30 and the ground reference. The positive terminal of the battery 12 is connected to the common node 30, while the negative terminal of the battery is connected to a common return line 34. The output voltage gain circuitry 33 is connected between the capacitor 32 and the regulator controller 20.

The power supply further includes a charging current sensor comprising a resistor 36 connected between the common return line 34 and the ground reference. The common return line 34 is also connected to the positive terminal of an output current amplifier 40. The negative terminal of the amplifier 40 is connected to output current gain circuitry 41. The voltage across the resistor 36 is amplified by the output current amplifier 40 and gain control circuitry 41 to generate an output signal which is indicative of the battery charging current. An input current sensor comprising a resistor 42 is connected in series between the AC adapter 14 and the DC/DC power supply 16. One end of the current sensing resistor 42 is connected to input current conversion circuitry 43. The conversion circuitry 43 is connected to the positive terminal of an input current amplifier 44 which amplifies the voltage across the resistor 42 and generates an output signal which is indicative of the current being drawn by the computer system.

The amplitude-scaled output signals proportional to the input and output current which are generated by the input and output current amplifiers are effectively OR'ed by a peak detector 45 such that the higher level signal is input to the regulator controller 20 at $IN_2$. The regulator controller 20 further monitors the output voltage by detecting the voltage across an output voltage sensor comprising a capacitor 32. The output voltage is scaled by the output voltage gain circuitry 33 and input to the controller 20 via a signal line 46 connected to the regulator controller at $IN_1$.

As described above, the controller operates in a conventional manner such that the width of the pulses output by the controller at O is controlled by the signals input at $IN_1$ and IN$_2$. When any parameter exceeds a predetermined threshold value, the regulator output is disabled such that the MOSFET 22 is biased off by the driving circuit 21 and no current from the adapter 14 flows through the MOSFET 22 to the battery 12. If all of the monitored current and voltage parameters are below their predetermined maximum values, the regulator output O is enabled and the pulse width output by the regulator controller 20 is controlled in accordance with the level of the input control signals to provide the proper amount of charging current to the battery. Specifically, when the regulator controller output is enabled, the MOSFET 22 is biased on by the driving circuit 21 during each regulator cycle and any current output by the AC adapter 14 which is not being used by the system is supplied to battery 12. In this manner, the current output by the AC adapter 14 which is not being used by other components in the computer system is available for use in charging the battery 12 and the efficiency of the AC adapter is maximized.

Figure 2:
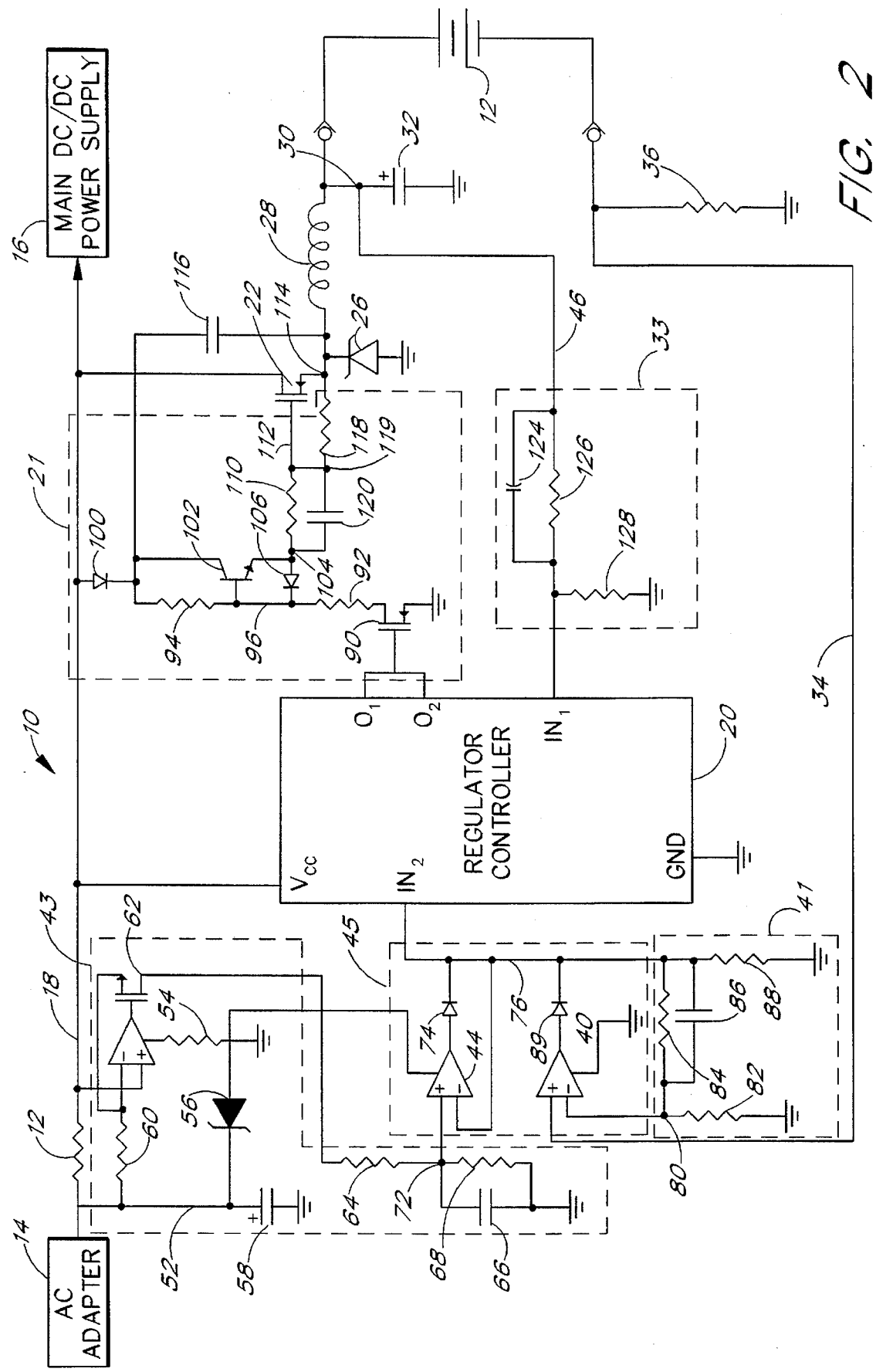
FIG. 2 is a schematic diagram of the system of FIG. 1.

FIG. 2 illustrates a more detailed diagram of one embodiment of the power supply of the present invention. The regulator controller 20 preferably comprises an integrated circuit (IC) such as the TL594 Pulse-Width Modulation Control Circuit manufactured by Texas Instruments of Dallas, Tex. The IC includes an internal oscillator preferably operating at a frequency of 200 KHz and has 2 inputs IN$_1$ and IN$_2$, and 2 outputs O$_1$ and O$_2$.

As described above, an input current sensing resistor 42 is connected between the AC adapter 14 and the main DC/DC power-supply 16. Thus, the current through the resistor 42 represents the total current being drawn by the system. Components 50–68 serve to convert the current through the resistor 42 to a desired voltage level. At one end of the input current sensing resistor 42, the adapter output line 18 is connected to the positive input terminal of an amplifier 50. The opposite end of the resistor 42 is connected to a common signal line 52. A 4.7KΩ resistor 54 is connected between the negative voltage supply terminal of the amplifier 50 and the ground reference and a Zener diode 56 is connected between the resistor 54 and the common signal line 52. A capacitor 58 is connected between the common signal line 52 and the ground reference. A 100Ω resistor 60 is connected between the common signal line and the negative input terminal of the amplifier 50. As the positive and negative input terminals of the amplifier 50 are, by definition, virtually the same when the amplifier is operational, the voltage across the resistor 60 is virtually the same as the voltage across the resistor 42.

The output of the amplifier 50 is connected to the gate of a MOSFET 62. The source of the MOSFET 62 is connected between the resistor 60 and the negative input terminal of the amplifier 50, while the drain of the MOSFET 62 is connected to a 3.9 KΩ resistor 64. A 10 µF capacitor 66 and a 5.49KΩ resistor 68 are each connected between the resistor 64 and the ground reference. In operation, the current through the resistor 60 is output through the operational amplifier 50 to bias the gate of a MOSFET 62 on. The current then flows through the drain of the MOSFET 62 and through resistors 64 and 68. Because the current through the resistor 68 is the same as the current through the resistor 60 and the voltage across the resistor 60 approximately equals the voltage across the resistor 42, it follows that the voltage across the resistor 68 is proportional to the voltage across the resistor 42, and therefore is proportional to the current through the resistor 42. Thus, the voltage at the positive input terminal of the amplifier 44 is proportional to the current being drawn by the system.

The positive input terminal of the input current amplifier 44 is connected to a common node 72 between the resistor 64 and the resistor and capacitor 66, 68. The output of the amplifier 44 is connected to the anode of a diode 74 while the cathode of the diode 74 is connected to an input IN$_2$ of the regulator controller 20 via a signal line 76. The negative input terminal of the amplifier 44 is also connected to the signal line 76.

As set forth above, the return line 34 is connected to the positive terminal of the amplifier 40. The negative input terminal of the amplifier 40 is connected to a common signal line 80. A 1KΩ resistor 82 is connected between the common signal line 80 and the ground reference. A 39KΩ resistor 84 and a 0.33 µF capacitor 86 are each connected between the common signal line 80 and the regulator controller input signal line 76. A 15KΩ resistor 88 is connected between the regulator controller input signal line 76 and the ground reference. The output of the amplifier 40 is connected to the regulator controller input signal line 76 through a diode 89. The output current sensing resistor 36 is connected to the positive input terminal of the output current amplifier 40 via the signal line 34 and senses a voltage proportional to the battery charging current. The amplifier 40 acts to amplify the voltage across the resistor 36 by a gain factor as provided by the resistors 82 and 84.

The amplifiers 40 and 44 are preferably provided on a single IC chip, such as the LM358 Low Power Dual Operational Amplifier manufactured by National Semiconductor of Santa Clara, Calif. The amplifiers 40 and 44, in combination with diodes 74 and 89, function as an effective OR gate which inputs the highest of the two signals output by the amplifiers to the regulator controller input at IN$_2$ via signal line 76. As set forth above, a voltage proportional to the battery charging current is input to the amplifier 40, while a voltage proportional to the current being drawn by the system is input to the amplifier 44. When the voltage output of one amplifier is higher than the other, the diode associated with the lower level signal is biased off by the higher level signal and the higher level signal is input to the regulator controller 20 at IN$_2$ through its associated diode. For example, if the voltage output of the amplifier 44 was 3 V and the output of the amplifier 40 was 2 V, a 3 V signal would be input to the regulator controller 20 at IN$_2$.

The regulator controller 20 continuously monitors the input signals at IN$_1$ and IN$_2$ and controls the pulse width of the signal output at 0 in accordance therewith. The control signal at IN$_1$ is monitored to detect if either the system input current or the battery charging current exceeds a predetermined maximum value. In particular, the voltage proportional to the system input current is monitored to ensure that the input current is limited to the rated current level of the AC adapter 14. The voltage proportional to the battery charging current is also monitored to provide short circuit protection and limit the battery charging current in the event that the output were to short to ground. Preferably, the regulator limits the system input current to 1.8 amps and the battery charging current to 3.5 amps. The regulator controller 20 further monitors the output voltage across the capacitor 32 at IN$_1$ to prevent the output voltage from rising above a predetermined level in the event that the battery is removed from the power supply. Preferably, the regulator ensures that the output voltage does not exceed 15 volts.

The regulator controller 20 compares the signals input at inputs IN and IN$_2$ with the internal 5 V reference signal. The values of the resistors 42, 60, and 68 are selected based on the rated maximum current of the AC adapter 14 such that when the AC adapter current reaches the maximum, the voltage across the resistor 68 is 5 V. As set forth above, the resistors 42, 60, and 68 preferably have values of 0.05Ω, 100Ω and 5.49KΩ respectively. Thus, when the input current is 1.8 Amps, the voltage across the resistor 68 will equal 1.8×0.05/100×5.49K=5 volts. Similarly, the values of the resistors 82 and 84 are chosen to provide a gain which will amplify the voltage across the resistor 36 to 5 V when the maximum battery current is reached. Preferably, the resistors provide a gain factor of 40. Thus, when the maximum battery current of 2.5 amps is reached, the voltage across the resistor 36 will be 0.13 volts and the amplifier 40 will amplify this voltage to 5 volts. In a similar manner, output voltage gain circuitry 33 comprises a 0.0022 µF capacitor 124, a 20KΩ resistor 126, and a 10KΩ resistor 128 which will attenuate the output voltage to 5 V when a maximum voltage level of 15V is reached across the capacitor 32.

When any parameter exceeds the 5 V reference signal, the regulator output is disabled such that the MOSFET 22 is biased off by the driving circuit 21 and no current from the adapter 14 flows through the MOSFET 22 to the battery 12. If all of the monitored current and voltage parameters are below their predetermined maximum values, the regulator output O is enabled and the pulse width output by the regulator controller 20 is controlled in accordance with the level of the input control signals to provide the proper amount of charging current to the battery. Specifically, when the output voltage sensed across the capacitor 32 increases, the pulses output from the regulator are narrowed so that less charging current per cycle is supplied to the battery. Similarly, if the voltage signals proportional to the system input current through the resistor 42 or output current through the resistor 36 increase, less charging current is supplied to the battery 12 by shortening the pulses output by the regulator at O. On the other hand, when any of these control voltages decrease, the output pulse width is widened to provide more charging current per cycle to the battery 12.

Components 90 through 120 act as a driver for the MOSFET 22 as well known to those skilled in the art. When either input to the regulator controller 20 reaches or exceeds 5 V, the output level at $O_1$ or $O_2$ is high and the driving circuit 21 subsequently biases the MOSFET 22 off to prevent current output by the AC adapter 74 from reaching the battery 12. Conversely, when the controller inputs are below their respective levels, the output at $O_1$ or $O_2$ is low and the driving circuit 21 subsequently biases the MOSFET 22 on during each cycle to conduct current from the AC adapter signal line 18 to the battery 12.

Specifically, the outputs $O_1$ and $O_2$ of the regulator controller 20 are connected to the gate of a MOSFET 90. The source of the MOSFET 90 is connected to the ground reference, while the drain is connected to a 33Ω resistor 92. The resistor 92 is connected to a 470Ω resistor 94 via a common signal line 96. A diode 100 is connected between the resistor 94 and AC adapter signal line 18. The base of a BJT 102 is connected to the common signal line 96 and the emitter is connected to a common node 104. A diode 106 is connected between the common node 104 and the signal line 96. A 4.7KΩ resistor 110 is connected at one end to the common node 104 and at the other end to the gate of the MOSFET 22 by a signal line 112.

The drain of the MOSFET 22 is connected to the AC adapter signal line 18 and the source is connected to a common signal line 114. A 0.1 µF capacitor 116 is connected between the common signal line 114 and the collector of the BJT 102. A 4.7KΩ resistor 118 is connected between a common node 119 and the common signal line 114 and a 0.331 µF capacitor 120 is connected between the common nodes 104 and 119. The common node 119 is further connected to the signal line 112 via a signal line 122.

When the controller output level is high, the gate to source voltage of the MOSFET 90 is greater than the threshold voltage and the MOSFET is biased on. When the MOSFET 90 is biased on, current from the AC adapter 14 is conducted through the diode 100 and the resistor 94 and directed through the resistor 92 and the MOSFET 90 to the ground reference. Thus, the current at the base of the BJT 102 is below the threshold level and the BJT 102 is biased off. When the BJT 102 is off, the MOSFET 22 is also biased off since the gate to source voltage of the MOSFET is below the threshold. When the MOSFET 22 is off, the diode 26 conducts and the inductor 28 discharges current stored therein through the diode and the capacitor 32. Current is also stored in the capacitor 116 when the MOSFET 22 is off.

Conversely, when the regulator controller output level is low, the gate to source voltage of the MOSFET 90 is below the threshold and the MOSFET is biased off. When the MOSFET 90 is off, some of the current from the AC adapter conducted by the diode 100 and resistor 94 is diverted to the base of the BJT 102 since the MOSFET 90 and the diode 92 are effectively open circuits, thereby raising the base current above the threshold so that the BJT 102 conducts and its collector current biases the MOSFET 22 on. When the MOSFET 22 is on, the diode 26 does not conduct and the current from the AC adapter not being used by the system flows through the drain and source of the MOSFET and into the inductor 28 and capacitor 32. Thus, as those skilled in the art will appreciate, the inductor 28 and capacitor 32 act in a conventional manner to filter the charging current supplied to the battery 12.

Additionally, when MOSFET 22 is turned on, the charge stored by the capacitor 116 is discharged through the BJT 102. The stored charge also serves to turn the diode 100 off so that no current from the AC adapter 14 is conducted by the diode 100. The capacitor 120 and resistor 110 act as a voltage dropping resistor which turns the MOSFET 22 off with a negative voltage when the capacitor 120 is charged to ensure that the maximum gate to source breakdown voltage of the MOSFET 22 is not exceeded.

Thus, when the input current, charging current, and output voltage parameters are below their respective maximum values, the power supply of the present invention operates to supply current from the AC adapter which is not being used by the system to the battery to charge the battery. In this manner, when the current drawn by the computer system is less than the maximum, the remainder of the current which can be output by the AC adapter is utilized to charge the battery. This maximizes the efficiency of the AC adapter and reduces the size of the adapter.

Although the preferred embodiment of the present invention has been described and illustrated above, those skilled in the art will appreciate that various changes and modifications to the present invention do not depart from the spirit of the invention. For example, other specific implementations of the circuitry in FIG. 1 and FIG. 2 may be used to the current and voltage sensors or the regulator. Accordingly, the scope of the present invention is limited only by the scope of the following appended claims.

We claim:

1. A power supply for recharging a battery in a portable computer system from a conventional AC adapter, said power supply comprising:

a conventional AC adapter which supplies input current, said input current comprising a system current for operating said computer system and a charging current for charging said battery, said AC adapter having a substantially constant DC output voltage across first and second terminals of said AC adapter, said AC adapter supplying said input current via said first and second terminals;

a first sensor connected to measure a level of said input current supplied by said AC adapter to said computer system and to said battery, said input current having a first maximum limit;

a second sensor connected to measure a level of said charging current supplied to said battery, said charging current having a second maximum limit;

a third sensor connected to measure an output voltage level of said battery, said output voltage level having a third maximum limit;

a controller connected to said first, second and third sensors, wherein said controller monitors said input current level, said charging current level, and said output voltage level and generates a control signal responsive to said input current level, said charging current level and said output voltage level; and a charging current control circuit connected to receive said control signal from said controller, said control circuit further being connected between said AC adapter and said battery to control charging current flow between said AC adapter and said battery based upon said control signal generated by said controller, said controller generating said control signal to cause said control circuit to block charging current flow when at least one of said input current level, said charging current level and said output voltage level exceeds its respective maximum limit, said controller generating said control signal to cause said control circuit to provide charging current at a variable level when all of said input current level, said charging current level and said output voltage level are less than said respective maximum limits, said variable charging current level controlled to cause said input current level to be maintained approximately at said first maximum limit as long as said second maximum limit and said third maximum limit are not exceeded.

2. The power supply of claim 1, wherein said first sensor comprises a resistor connected between said AC adapter and a DC/DC converter which supplies operating power for said computer system.

3. The power supply of claim 1, wherein said second sensor comprises a resistor connected between said battery and a ground reference.

4. The power supply of claim 1, wherein said third sensor comprises a resistor connected to said output of said power supply.

5. The power supply of claim 1, wherein said charging current control circuit includes a transistor connected to said AC adapter and to said battery, wherein said transistor is biased on and off in accordance with said control signal generated by said controller to control current flow between said AC adapter and said battery.

6. The power supply of claim 1, further comprising a filter connected between said charging current control circuit and said battery which filters said charging current supplied to said battery.

7. A regulator for controlling charging current flow between a conventional AC adapter and a battery in a portable computer system, wherein said AC adapter provides an input current which comprises a charging current provided to said battery and a system current provided to electronic components of said portable computer system, said regulator comprising:

a controller connected to said AC adapter, said battery, and an output of said regulator to monitor a first input signal indicative of a level of said input current supplied by said AC adapter, to monitor a second input signal indicative of a level of said charging current supplied to said battery, and to monitor a third input signal indicative of an output voltage of said regulator, wherein said controller generates a control signal responsive to said first, second and third input signals, said control signal having a first inactive state when any one of said first, second and third input signals exceeds a respective first, second and third limit value, said control signal having a second variable active state when none of said first, second and third input levels exceed said respective first, second and third limit values; and a charging current control circuit connected to said controller and to said battery and responsive to said control signal from said controller, wherein said charging current control circuit supplies said charging current from said AC adapter to charge said battery when said control signal from said controller has said variable active state, said controller varying said active state to cause said first input level to be maintained approximately at said first limit value regardless of changes of said system current provided to said electronics in said portable computer system as long as said second input signal and said third input signal are below said respective second limit value and third limit value.

8. The regulator of claim 7, wherein said charging current control circuit includes a transistor connected between said AC adapter and to said battery, wherein said transistor is biased on and off in accordance with said output signal generated by said controller to control current flow between said AC adapter and said battery.

9. The regulator of claim 8, further comprising a driving circuit connected between said controller and said charging current control circuit for driving said transistor.

10. The regulator of claim 7, further comprising a filter connected between said charging current control circuit and said battery which filters said charging current supplied to said battery.

11. A power supply for recharging a battery in a portable computer system, said power supply comprising:

a conventional AC adapter which supplies input current, said input current comprising a system current for operating said computer system and comprising a charging current for charging said battery, said input current having a total input current level comprising an approximate sum of said system current and said charging current;

an input current sensing circuit connected to said AC adapter which detects a level of said total input current from said AC adapter;

a charging current sensing circuit connected to said battery which detects a level of said charging current supplied to said battery;

an output voltage sensing circuit connected to an output of said power supply which detects an output voltage level of said power supply;

a controller connected to said sensing circuits, wherein said controller compares said input current level, said charging current level, and said output voltage level with respective predetermined maximum values and generates a control signal responsive to differences between said input current level, said charging current level and said output voltage level and said respective predetermined maximum values; and a charging current control circuit connected to said controller and to said battery, wherein said control circuit controls current flow between said AC adapter and said battery in response to said control signal generated by said controller, said control signal controlled by said controller to cause said charging current level to have a magnitude approximately equal to a difference between said predetermined maximum level for said input current level and an amount of current being supplied to said computer system as long as none of said input current level, said charging current level and said output voltage level exceed said respective predetermined maximum values.

12. The power supply of claim 11, wherein said input current sensing circuit includes a resistor connected between said AC adapter and a DC/DC converter which supplies operating power for said computer system.

13. The power supply of claim 11, wherein said charging current sensing circuit includes a resistor connected between said battery and a ground reference which senses a voltage proportional to said charging current.

14. The power supply of claim 11, wherein said output voltage sensing circuit includes a resistor connected to said output of said power supply.

15. A method of regulating the amount of charging current supplied to a rechargeable battery by a regulator in a portable computer system, wherein said computer system includes a conventional AC adapter which supplies input current, said input current including a system current for operating said computer system and a charging current for charging said battery, said method comprising the steps of:

sensing a level of said input current supplied by said AC adapter;

sensing a level of said charging current supplied to said battery;

sensing a level of an output voltage of said regulator;

comparing said input current level with a maximum input current level, comparing said charging current level with a maximum charging current level, and comparing said output voltage level with a maximum output voltage level;

generating a control signal responsive to results of said comparing steps; and controlling charging current flow from said AC adapter to said battery based upon said control signal, said control signal adjusted in response to changes in said system current to cause said charging current to have a level selected to maintain said input current level approximately equal to said maximum input current level as long as said charging current level is less than said maximum charging current level and said output voltage level is less than said maximum output voltage level.

16. A power supply for recharging a battery in a portable computer system, said power supply comprising:

a conventional AC adapter which supplies input current which includes a system current for operating said computer system and which includes a charging current for charging said battery;

a sensor which detects the level of said input current provided by said AC adapter;

a controller connected to said sensor which generates a control signal responsive to a difference between said detected input current level and a predetermined maximum input current level; and a charging current control circuit connected to receive said control signal from said controller and connected between said AC adapter and said battery to control charging current flow between said AC adapter and said battery based upon said control signal generated by said controller, said controller and said control circuit operating to maintain said charging current flow at a level such that said input current level is maintained at approximately said maximum input current level until said battery is fully charged.

* * * * *